United States Patent
Yang et al.

(10) Patent No.: US 9,950,706 B1
(45) Date of Patent: Apr. 24, 2018

(54) DRIVELINE SYSTEM WITH NESTED LOOP DAMPING CONTROL

(71) Applicant: GM GLOBAL TECHNOLOGY OPERATIONS LLC, Detroit, MI (US)

(72) Inventors: Jie Yang, Okemos, MI (US); Robert L. Morris, Milford, MI (US); Chia-Shang Liu, Ann Arbor, MI (US); Yo Chan Son, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/671,989

(22) Filed: Aug. 8, 2017

(51) Int. Cl.
    *B60W 20/15* (2016.01)
    *B60K 6/26* (2007.10)

(52) U.S. Cl.
    CPC .............. *B60W 20/15* (2016.01); *B60K 6/26* (2013.01); *B60W 2710/083* (2013.01); *B60Y 2200/92* (2013.01); *B60Y 2300/22* (2013.01); *Y10S 903/906* (2013.01)

(58) Field of Classification Search
    CPC ... B60W 20/15; B60W 2710/083; B60K 6/26; B60Y 2200/92; B60Y 2300/22; Y10S 903/906
    See application file for complete search history.

(56) References Cited

U.S. PATENT DOCUMENTS

| | | | | |
|---|---|---|---|---|
| 2004/0176171 A1* | 9/2004 | Clausin | ................... | F16F 15/18 464/2 |
| 2011/0033322 A1* | 2/2011 | Barthel | ................ | B60T 8/4059 417/410.1 |
| 2017/0353141 A1* | 12/2017 | Schanz | ................ | H02P 29/032 |

* cited by examiner

*Primary Examiner* — Richard M Camby
(74) *Attorney, Agent, or Firm* — Quinn IP Law

(57) ABSTRACT

A driveline system includes a drive axle coupled to a load, an electric machine, and a control system. The electric machine is responsive to a commanded torque, has a rotor shaft coupled to the axle, and produces an output torque that rotates the axle and load to produce driveline oscillation at a high resonant frequency. The control system generates the commanded torque using a nested control loop architecture in which an outer control loop operates at a sampling rate that is below a critical rate necessary for controlling the resonant frequency, and an inner control loop operates at a sampling rate that is above the critical rate. The inner loop determines a modified torque command and acceleration value in response to a commanded torque from the outer loop. The electric machine is thereafter controlled via the commanded torque.

16 Claims, 2 Drawing Sheets

DRIVELINE SYSTEM WITH NESTED LOOP DAMPING CONTROL

INTRODUCTION

A driveline delivers torque from a torque generating device to a coupled load via a rotatable shaft or axle. For instance, a vehicular driveline system may include one or more high-voltage electric machines coupled to a drive axle via a geared power transmission arrangement. Torque from the electric machines is imparted to the drive axle to power the load, such as by rotating a set of drive wheels, turning an electric generator to generate electricity, or rotating a propeller shaft. The electric machines may act alone or in conjunction with an internal combustion engine or another torque generating device. Undesirable driveline oscillation may result due to interaction of the rotating electric machine and stiffness of the drive axle to which the electric machine is coupled. Depending on the structure and dynamics of the driveline system, such driveline oscillation may occur at a relatively high resonant frequency.

SUMMARY

A driveline system is disclosed herein along with a nested loop-based active damping control methodology. The driveline system, which includes one or more electric machines coupled to a rotatable axle, may experience driveline oscillation or vibration at a relatively high resonant frequency. By way of an illustrative example, an electric machine having a relatively small mass may be connected to an axle via a geared arrangement. Twisting of the axle in such an embodiment may lead to the above-noted high frequency driveline oscillation, with such oscillation thereafter actively damped using the nested loop control architecture presented in this disclosure.

In the nested loop control architecture, a relatively fast control loop, referred to as the inner control loop or inner loop, is used to lower the resonant frequency of the driveline oscillation to a level suitable for damping within a relatively slow control loop, i.e., the outer control loop/outer loop. In a particular embodiment, the driveline system may include an electric machine, a transmission, an axle connected to the electric machine via the transmission, a load connected to the axle, and the nested loop control system. The electric machine, which is responsive to a commanded torque and has a rotor shaft coupled to the axle, produces an output torque that rotates the axle and the coupled load in a manner that produces the driveline oscillation with the high resonant frequency noted above.

The control system in this embodiment generates the commanded torque using the nested control loops. The outer and inner loops operate at a sampling rate that is respectively below (i.e., slower than) and above (i.e., faster than) the critical rate necessary for controlling the resonant frequency. For instance, a sampling rate is typically required to be on the order of 8-10 times faster than the oscillation being damped, e.g., a 160 Hz sampling rate is able to handle 16 Hz oscillations and so forth. Thus, "high" in terms of the resonant frequency refers to a frequency level exceeding the control capability of the sampling rate of the slower of the nested control loops, i.e., the outer loop.

The faster inner loop modifies the effective inertia of the motor by sensing the rotational acceleration of the motor shaft and generating an acceleration-based feedback torque command, which is negatively proportional to the sensed acceleration, thereby creating virtual inertia. The inner control loop receives the commanded torque from the outer control loop and generates a modified torque command, a sensed motor speed, and a sensed acceleration value of the rotor shaft in response to the commanded torque. The outer control loop calculates a difference between a reference speed of the electric machine and the motor speed, and generates the commanded torque using the calculated difference.

The load in certain embodiments may include drive wheels of a motor vehicle. Such a vehicle may be embodied as a hybrid electric vehicle, in which case the control system may include a hybrid control processor (HCP) and a motor control processor (MCP). The HCP in this configuration generates the feed-forward torque command, which in turn acts as the commanded torque for driving the electric machine. The MCP controls operation of the electric machine in response to the commanded torque. The sampling rate of the MCP may be at least three times faster than the sampling rate of the HCP. For instance, the HCP may have a sampling rate of 6.25 ms and the MCP may have a sampling rate of 2 ms.

The inner control loop may communicate an acceleration value of the electric machine to a feedback logic block in response to the commanded torque, and determine a feedback torque term using the feedback logic block. The feedback torque term is then added to the commanded torque.

A motor vehicle is also disclosed that includes drive wheels, a drive axle coupled to the drive wheels, a transmission, an electric machine, and a control system. The electric machine is ultimately responsive to a commanded torque, has a rotor shaft coupled to the drive axle via the transmission, and produces an output torque that rotates the drive axle and the drive wheels in a manner that produces a driveline oscillation having a high resonance frequency. The control system has the nested control loop architecture noted above.

Additionally, a method is provided for actively damping a high-frequency driveline oscillation in a driveline system using a control system having the above-noted nested loop control architecture. The method includes generating a commanded torque using the nested control loop architecture, in which an outer control loop operates at a sampling rate that is below the critical rate necessary for controlling the high resonant frequency, and an inner control loop operates at a sampling rate that is above the critical rate. The method includes determining the commanded torque and a motor speed of the rotor shaft within the inner control loop, and generating the commanded torque via the outer control loop. This is accomplished by subtracting the motor speed from a reference speed. The method also includes controlling the electric machine via a control system using the commanded torque from the outer loop so as to cause a rotor shaft of the electric machine to rotate a drive axle and a coupled load.

The above-noted and other features and advantages of the present disclosure are readily apparent from the following detailed description of the best modes for carrying out the disclosure when taken in connection with the accompanying drawings.

Figure 1:
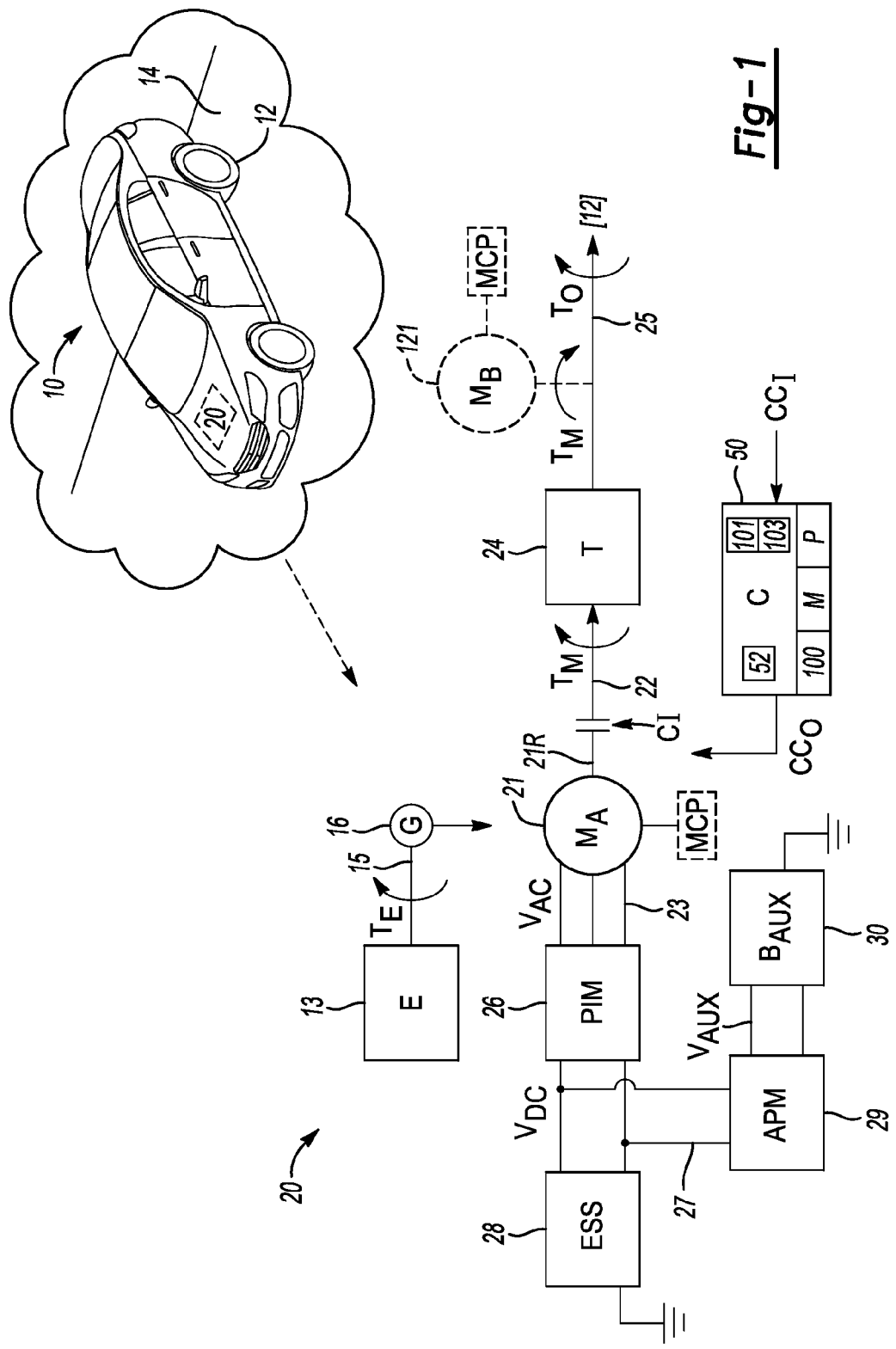
FIG. 1 is a schematic illustration of an example driveline system having a driveline and a control system with a nested loop control architecture configured to damp a high resonant frequency on the driveline.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

Referring to the drawings, wherein like reference numbers refer to the same or similar components throughout the several views, and beginning with FIG. 1, an example vehicle 10 includes a powertrain 20 having a driveline system 11. The driveline system 11 includes one or more torque generating devices, at least one axle, and a driven load coupled to the axle(s). In the illustrated embodiment, the load includes drive wheels 12 in rolling frictional contact with a road surface 14. The driveline system 11 includes an electric machine ($M_A$) 21 having a rotor shaft 21R that is coupled to an input shaft 22 of a transmission (T) 24 via an input clutch CI. The transmission 24 may include one or more planetary gear sets (not shown) or other geared arrangements suitable for transferring an output torque (arrow $T_O$) to an output shaft/drive axle 25, and from the drive axle 25 to the road wheels 12. Some embodiments may also include another electric machine ($M_B$) 121 coupled to the input shaft 22 or the drive axle 25.

The vehicle 10 includes a control system (C) 50 providing active damping of the driveline system 11. At times, driveline oscillation may occur within the driveline system 11 at a relatively high resonant frequency. To simplify active damping of such high-frequency oscillation, the control system 50 uses a nested loop control architecture as shown in FIG. 4 and described below, in which a relatively fast inner control loop 103 lowers the resonant frequency of the driveline oscillation to a frequency level suitable for active damping by a relatively slow outer control loop 101.

Figure 4:
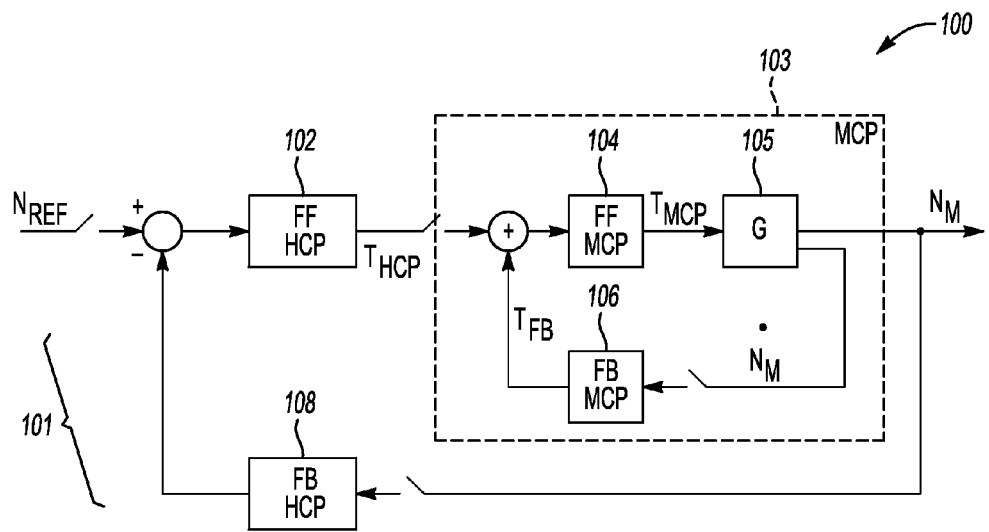
FIG. 4 is a logic block diagram describing operation of the nested loop control system described herein.

The inner control loop 103 is nested within the outer control loop 101 as depicted in FIG. 4. The control system 50 is shown as a single control device for illustrative simplicity, but may be embodied as separate motor control processor (MCP) collocated with a corresponding one of the electric machines 21 and a hybrid control processor (HCP) coordinating and regulating overall operation of the electric machine(s) 21 and 121 with optional additional torque generating devices. The distributed MCP/HCP configuration is described in further detail below with reference to FIG. 4.

By way of illustration, the electric machine 21 (and possibly an electric machine 121) may be embodied as a polyphase electric traction motor having phase windings 23 carrying an AC voltage ($V_{AC}$). When the phase windings 23 are electrically energized, a rotor and connected motor output shaft of the electric machine 21 deliver motor torque (arrow $T_M$) to the drive wheels 12 or another coupled load such as a belt and pulley system or propeller (not shown). In the illustrated example embodiment, a power inverter module (PIM) 26 is electrically connected to an energy storage system (ESS) 28 over a high-voltage DC bus 23 carrying a DC voltage ($V_{DC}$), and operable for inverting a direct current voltage and corresponding electrical current from the ESS 28 into an alternating current voltage ($V_{AC}$) and electrical current, e.g., using a series of semiconductor switches, diodes, and other semiconductor components (not shown) and pulse width modulation or other suitable switching techniques.

The powertrain 20 of FIG. 1 may optionally include an electric generator ($G_N$) 16 that is selectively driven by engine torque (arrow $T_E$) from an internal combustion engine (E) 13, which may be provided via an engine crankshaft 15. Such an embodiment may be used when the vehicle 10 is an extended range electric vehicle in which propulsion torque is provided solely via the electric machine 21, with engine torque used to generate electricity for recharging the ESS 28 and/or directly powering the electric machine 21 as needed. For lower-voltage/auxiliary systems aboard the vehicle 10, an auxiliary power module (APM) 29 may be electrically connected to the DC bus 23 and configured to reduce a bus voltage to an auxiliary 12-15 VDC level. The APM 29 may then output the auxiliary voltage to an auxiliary DC voltage bus ($V_{AUX}$) 27 and to an auxiliary battery ($B_{AUX}$) 30 connected thereto.

Figure 2:
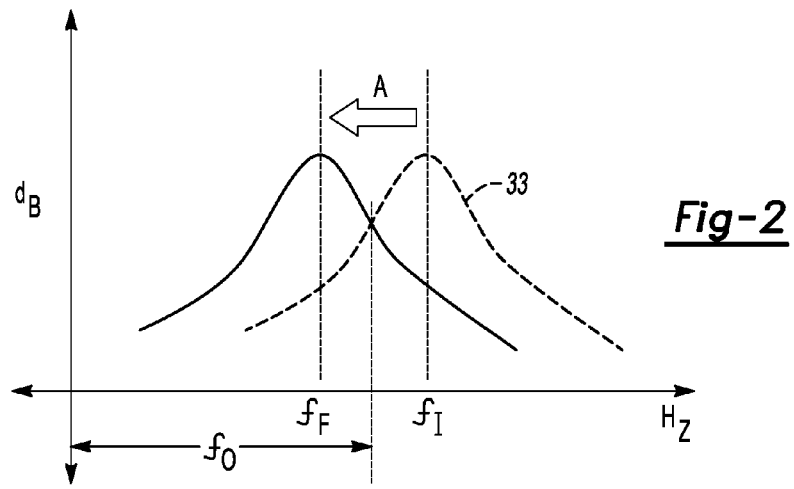
FIG. 2 is a schematic depiction of a frequency shift enabled by the nested loop control system described herein, with frequency depicted on the horizontal axis and amplitude of driveline oscillation depicted on the vertical axis.

Operation of the control system 50 of FIG. 1 is further illustrated with reference to FIGS. 2 and 3. FIG. 2 depicts an example driveline oscillation trace 33, with frequency in hertz (Hz) depicted on the horizontal axis and amplitude in decibels (dB) depicted on the vertical axis. Oscillation trace 33 has an initial resonant frequency $f_I$ that lies above the frequency $f_O$ that can be controlled with the slower sampling rate of the outer control loop 101 shown in FIGS. 1 and 4. As a result, active damping control efforts conducted solely by the outer control loop 101 will not affect the high-frequency driveline oscillation. Operation of the control system 50 and its nested control loop architecture is therefore intended to shift the oscillation trace 33 in the direction of arrow A to a lower final frequency $f_F$. The lower final frequency $f_F$ is below the frequency $f_O$ that can be controlled with the sampling rate of the outer control loop 101, and therefore may be effectively damped using the slower outer control loop 101.

Figure 3:
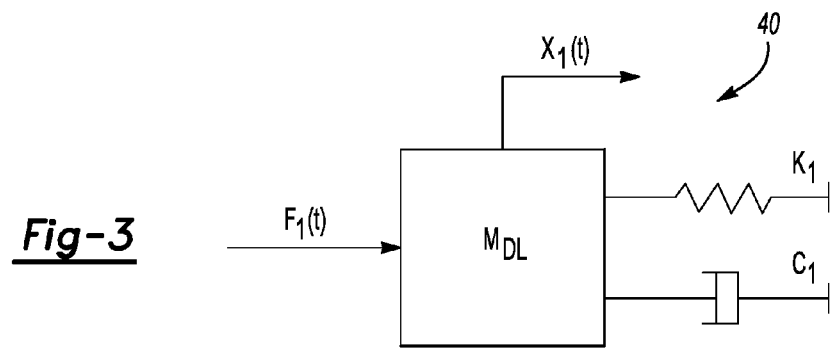
FIG. 3 is a schematic mass spring damper model illustrating the present method.

The particular driveline system 11 that is being actively damped by operation of the control system 50 of FIG. 1 may be modeled as a spring-mass-damper assembly 40 as shown in FIG. 3. A force $F_1(t)$ acting on a mass ($M_{DL}$) of the driveline system 11 causes a displacement $x_1(t)$ of the driveline system 11. With the driveline system 11 having a calibrated spring force ($k_1$) and a stiffness ($c_1$), the control system 50 uses the derivative of the motor speed of the electric machine 21 (i.e., an acceleration value) in the faster inner control loop 103 and applies a control force $k_{acc}x'_1(t)$ to the driveline system 11.

The above-noted control action is equivalent to increasing the inertia of the driveline system 11. As a result, the natural resonance frequency ($\omega_n$) of the driveline system 11 is reduced from $$\omega_n = \sqrt{\frac{k_1}{m1}} \text{ to } \omega'_n = \sqrt{\frac{k_1}{(m_1 + k_{acc})}}.$$

By adjusting the control gain $k_{acc}$, the control system 50 is able to reduce the resonant frequency in the inner control loop 103 to below the sampling frequency of the outer control loop 101.

FIG. 4 illustrates nested control logic 100 for the control system 50 of FIG. 1. The control system 50 is configured to generate a commanded torque ($T_{HCP}$) as part of the control signals (arrow $CC_O$) of FIG. 1, with a motor speed ($N_M$) of the electric machine 21 determined within the nested control loop configuration. The inner control loop 103 may be part of the internal logic of the MCP of the electric machine 21 shown in FIG. 1, in which case the sampling rate of the inner control loop may be three or more times faster than the sampling rate of the outer control loop 101, e.g., 2.0 ms and 6.5 ms for the inner and outer control loops 101 and 103, respectively.

The outer control loop 101 is configured to receive a reference speed ($N_{REF}$) of the electric machine 21, such as from a parameter-based model, estimation, or calculation. The reference speed ($N_{REF}$), which may be computed in the HCP when so configured, is a nominal speed at which the electric machine 21 of FIG. 1 should be rotating without oscillation when the electric machine 21 is coupled to the drive wheels 12. To this end, a model may receive operator inputs such as a requested acceleration and gear state, as well as information such as the current gear state, speed of the vehicle 10 and the electric machines 21 and 121, temperature, etc., and generate the reference speed ($N_{REF}$) using such information.

In response to such inputs, the outer control loop 101 uses a feed-forward block (FF HCP) 102 to generate the commanded torque ($T_{HCP}$), with the commanded torque ($T_{HCP}$) corresponding to the error-corrected reference speed ($N_{REF}$), i.e., the controller 50 of FIG. 1 subtracts a measured or calculated motor speed ($N_M$) from the reference speed ($N_{REF}$) to generate the commanded torque ($T_{HCP}$). The commanded torque ($T_{HCP}$) is fed into the inner control loop 103 where, ultimately, the inner control loop 103 determines the electrical current and switching operation needed to cause the electric machine 21 to produce the commanded torque ($T_{HCP}$).

The inner control loop 103 is configured to modify the commanded torque ($T_{HCP}$) from the outer control loop 101 into a modified torque command ($T_{MCP}$), i.e., a torque command to the electric machine 21 to generate the commanded torque ($T_{HCP}$) as closely as possible given existing motor constraints, and to determine an acceleration ($\dot{N}_M$) of the rotor shaft 22 of FIG. 1. A corresponding inner control loop (not shown) may be used for additional electric machines when multiple electric machines 21 are used, i.e., one inner control loop/MCP may be used per electric machine 21. For simplicity, the configuration of one electric machine 21 is described below.

Determination of the modified torque command ($T_{MCP}$) and the acceleration value ($\dot{N}_M$) occurs in the inner control loop 103 in response to receipt of the commanded torque ($T_{HCP}$) from the outer control loop 101. Within a feed-forward block (FF MCP) 104 of the inner control loop 103, the control system 50 generates the modified torque command ($T_{MCP}$), which is then fed into the physical system (G) 105, in this case the driveline system 11 having the electric machine 21 shown in FIG. 1. The electric machine 21 responds to the modified torque command ($T_{MCP}$) by rotating at the actual motor speed ($N_M$) and with the acceleration value ($\dot{N}_M$).

A feedback block 106 of the inner control loop 103 thereafter calculates a torque feedback term ($T_{FB}$) as a function of the acceleration value ($\dot{N}_M$), e.g., using a calibrated gain, which is then added to the commanded torque ($T_{HCP}$) from the outer control loop 101. Thus, blocks 105 and 106 together add a torque feedback component within the control logic 100 that is based on the acceleration value ($\dot{N}_M$) of the electric machine 21 as sensed or reported by the inner control loop 103.

A feedback block 108 (FB HCP) is also used as part of the outer control loop 101. At block 108, the motor speed ($N_M$) from the inner control loop 103 is acted on by the control system 50, e.g., by applying the calibrated gain ($K_{acc}$) noted above with reference to FIG. 3. Block 108 may be a signal pass-through, thus effectively eliminated from the logic flow. However, in practice block 108 may contain filters for removing noise and compensating for phase lag and temporal differences between the communicated motor speed ($N_M$) and the reference speed ($N_{REF}$).

Using the disclosed approach, the faster inner control loop 101 of FIG. 4 is used to modify characteristics of the physical plant, in this case the driveline system 11, to such a degree that the slower outer control loop 101 is able to actively damp the driveline oscillation. The feedback loop of the inner control loop 103 essentially generates virtual inertia and, as a result of this, effectively increases the inertia of the electric machine 21 to reduce the frequency response of the driveline system 11 sufficiently for the slower outer control loop 101 to actively damp the oscillations. In this way, intelligence with the control system 50 may be distributed for optimal control, and may be extended to dynamic systems having a resonant frequency that is higher than the damping capabilities of the slower controller.

While the best modes for carrying out the disclosure have been described in detail, those familiar with the art to which this disclosure relates will recognize various alternative designs and embodiments for practicing the disclosure within the scope of the appended claims.

What is claimed is:

1. A driveline system comprising:
a load;
a drive axle coupled to the load;
an electric machine responsive to a commanded torque, having a rotor shaft coupled to the drive axle, and producing an output torque that rotates the drive axle and the load in a manner that produces a driveline oscillation having a resonant frequency; and
a control system configured to generate the commanded torque and actively damp the driveline oscillation using a nested control loop architecture, the nested control loop architecture comprising an outer control loop operating at a sampling rate below a critical rate necessary to control the resonant frequency, and an inner control loop operating at a sampling rate above the critical rate, wherein:
the inner control loop is configured to generate a modified torque command for the electric machine in response to the commanded torque to cause the rotor shaft to rotate at a motor speed, and the outer control loop is configured to subtract the motor speed from a reference speed of the electric machine to thereby generate the commanded torque.

2. The driveline system of claim 1, further comprising a transmission, wherein the load includes a set of drive wheels and the rotor shaft is coupled to the drive axle via the transmission.

3. The driveline system of claim 2, wherein the control system includes a hybrid control processor (HCP) configured to generate the torque command and a motor control processor (MCP) configured to control operation of the electric machine in response to the commanded torque, with the sampling rate of the MCP being at least three times faster than the sampling rate of the HCP.

4. The driveline system of claim 3, wherein the sampling rate of the HCP is 6.25 ms and the sampling rate of the MCP is 2 ms.

5. The driveline system of claim 1, wherein the inner control loop includes a feedforward logic block configured to output a modified torque command to the driveline system, and the driveline system is configured to respond to the modified torque command by rotating the rotor shaft at the motor speed.

6. The driveline system of claim 1, wherein the inner control loop includes a feedback logic block that determines a feedback torque term using an acceleration value of the electric machine, and then adds the feedback torque term to the commanded torque to produce the modified torque command.

7. A motor vehicle comprising:
a set of drive wheels;
a drive axle coupled to the set of drive wheels;
a transmission;
an electric machine responsive to a commanded torque, having a rotor shaft coupled to the drive axle via the transmission, and producing an output torque that rotates the drive axle and the drive wheels in a manner that produces a driveline oscillation having a resonant frequency; and
a control system configured to generate the commanded torque and actively damp the driveline oscillation using a nested control loop architecture comprising an outer control loop operating at a sampling rate that is below a critical rate necessary for controlling the resonant frequency and an inner control loop operating at a sampling rate that is above the critical rate, wherein:
the inner control loop is configured to generate a modified torque command and, in response, cause the rotor shaft to rotate at a motor speed, and the outer control loop is configured to subtract the motor speed from a reference speed of the electric machine to thereby generate the commanded torque.

8. The motor vehicle of claim 7, wherein the control system includes a hybrid control processor (HCP) configured to generate the commanded torque and a motor control processor (MCP) configured to generate the modified torque command, with the sampling rate of the MCP being at least three times faster than the sampling rate of the HCP.

9. The motor vehicle of claim 8, wherein the sampling rate of the HCP is 6.25 ms and the sampling rate of the MCP is 2 ms.

10. The motor vehicle of claim 7, wherein the inner control loop includes a feedforward logic block configured to output the modified torque command to the electric machine, and the motor speed and an acceleration value of the electric machine are communicated to a feedback logic block in response to the modified torque command.

11. The motor vehicle of claim 10, wherein the inner control loop includes a feedback logic block that determines a feedback torque term using the acceleration value, and then adds the feedback torque term to the commanded torque to generate the modified torque command.

12. A method for actively damping a driveline oscillation having a high resonant frequency in a driveline system using a control system that includes a nested loop control architecture, the driveline system including an electric machine coupled to a load via a drive axle and a transmission, the method comprising:
generating a commanded torque using an outer control loop of the control system operating at a sampling rate that is below a critical rate necessary for controlling the resonant frequency and an inner control loop of the control system operating at a sampling rate that is above the critical rate;
determining a motor speed of the electric machine via the inner control loop;
generating the commanded torque via the outer control loop by subtracting the motor speed from a reference speed; and
controlling the electric machine via the inner control loop in response to the commanded torque from the outer control loop to thereby cause the electric machine to rotate the drive axle and coupled load while actively damping the driveline oscillation.

13. The method of claim 12, wherein the control system includes a hybrid control processor (HCP) that includes the outer control loop and a motor control processor (MCP) that includes the inner control loop.

14. The method of claim 13, wherein the sampling rate of the HCP is 6.25 ms and the sampling rate of the MCP is 2 ms.

15. The method of claim 12, wherein the inner control loop includes a feedforward logic block and a feedback logic block, the method further comprising: using the feedforward logic block to output a modified torque command to the electric machine in response to the commanded torque.

16. The method of claim 15, further comprising using the feedback logic block to determine a feedback torque term using an acceleration value of the electric machine, and then adding the feedback torque term to the commanded torque within the inner control loop to generate the modified torque command.

* * * * *